C. S. PRESTON.
VEHICLE TIRE.
APPLICATION FILED MAY 15, 1919.

1,377,627.

Patented May 10, 1921.

INVENTOR.
Clarence S. Preston.
BY A. B. Bowman
ATTORNEY

UNITED STATES PATENT OFFICE.

CLARENCE S. PRESTON, OF SAN DIEGO, CALIFORNIA.

VEHICLE-TIRE.

1,377,627.   Specification of Letters Patent.   Patented May 10, 1921.

Application filed May 15, 1919. Serial No. 297,181.

*To all whom it may concern:*

Be it known that I, CLARENCE S. PRESTON, a citizen of the United States, residing at San Diego, in the county of San Diego and State of California, have invented certain new and useful Improvements in Vehicle-Tires, of which the following is a specification.

My invention relates to a vehicle tire of the resilient type and the objects of my invention are: first, to provide a tire of this class in which the load is suspended on and supported by an elastic portion of the tire; second, to provide a tire of this class in which the resiliency of the tire is dependent upon the suspension of supporting members upon elastic portions of the tread section; third, to provide a tire of this class which is practically as resilient as a pneumatic tire and has all the general characteristics of operation and which will not puncture, become deflated or rim cut; fourth, to provide a tire of this class which may be readily applied to the vehicle felly now in use and fifth, to provide a tire structure of this class which is very simple and economical of construction, easy to install, durable and which will not readily deteriorate or get out of order.

Figure 1:
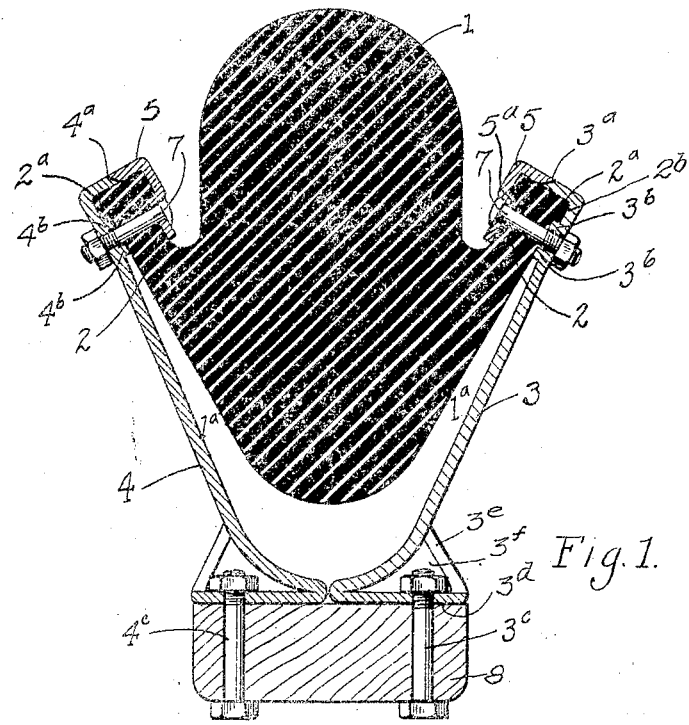
Figure 2:
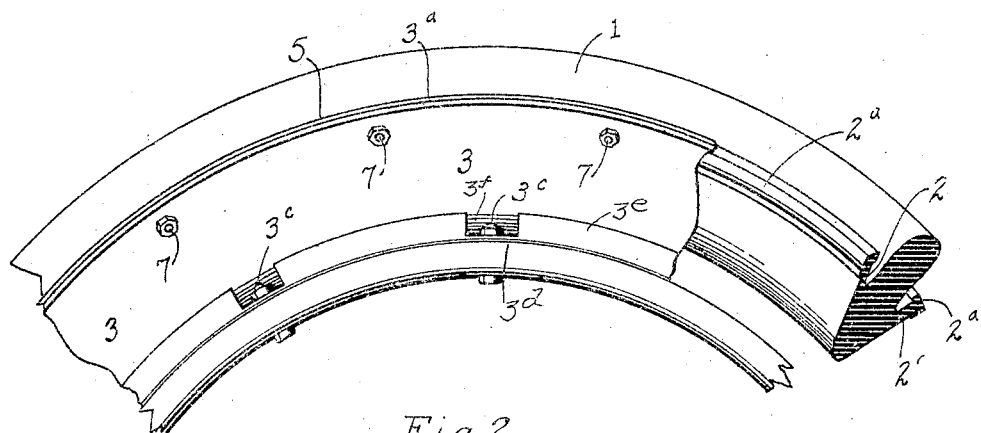

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a transverse sectional view of my tire in its preferable form, shown mounted on a felly. Fig. 2 is a perspective view of a fragmentary portion of the tire showing portions broken away and in section to facilitate the illustration.

Similar characters of reference refer to similar parts throughout the different views.

The tread portion 1, supporting extension portions 2, rim supports 3 and 4, binding members 5 and 6 and bolts 7 constitute the principal parts and portions of my vehicle tire.

The tread portion 1 consists of resilient material preferably rubber and is shaped as shown best in the drawings. It is provided with oppositely disposed extended flange portions 2 extending therefrom at an angle and having outer enlarged peripheral portions $2^a$. These portions 2 are preferably composed of a good grade of elastic material such as rubber and the like and are for the purpose of supporting the load. The enlarged peripheral portions are somewhat F shaped in cross section, that is, each has apposite annular side flanges $2^b$ for making secure and tight connections with the clamping members. Secured to these members 2 are the inclined or flaring rim supports 3 and 4 which are annular members adapted to fit one side of the members 2 and extend past the outer flange $B^2$ to near the middle of the enlarged portion $2^a$ and the inwardly turned edges are beveled at $3^a$ and $4^a$. These members 3 and 4 are provided with inwardly extending annular flanges $3^b$ and $4^b$ which are adapted to be pressed into the member 2 for holding said members 2 and 3 and 4 in their certain relative positions to each other. The inner edges of the members 3 and 4 and are secured to the felly 8 by means of bolts $3^c$ and $4^c$ in the construction shown. Each flaring rim portion is curved inward below the tread portion and turned or folded outward to form a bearing portion $3^d$ lying on the felly, and then turned upward and inward forming a brace portion $3^e$, bearing at its edge against the outer face of the rim. At intervals the brace portions $3^e$ are cut away at $3^f$ to give access to the nuts on the bolts $3^c$ and $4^c$ as shown in Figs. 1 and 2. The bolts pass through holes in the transversely flat portions $3^d$ applied to the felly and securely hold the rim portions in place on the felly. However, it is obvious that the inner ends of these members 3 and 4 may be secured to the felly in various ways as desired. Mounted on the opposite sides of the members 2 from the members 3 and 4 are the annular binding members 5 and 6 shaped as shown best in Fig. 1 of the drawings. Each binding member is made with an annular offset or shoulder $5^a$ to fit under the side flange $2^b$ and with an outwardly turned portion provided with a beveled edge adapted to project over the beveled edges $3^a$ and $4^a$ of the members 3 and 4 for supporting said members in their relative position when drawn together as shown in Fig. 1 of the drawings. These members 3 and 5 and 4 and 6 are drawn together and held in their relative positions and clamped over the portions 2 and 2ª by means of the bolts 7. It will be noted that considerable space is left between the member 1 and the members 3 and 4 at 1ª to permit the movement of the tread portion 1 relatively to the supports 3 and 4 in case an obstruction is run over by the tread portion, it being here noted that the members 2 are of sufficient strength to support the load under ordinary conditions as shown in Fig. 1 of the drawings.

Though I have shown and described a particular construction, combination and arrangement of parts and portions and their certain correlation to each other I do not wish to be limited to this particular construction, combination and arrangement nor to the particular correlation but desire to include in the purview of my invention the construction, combination and arrangement substantially as set forth in the appended claims.

It is obvious that with this construction there is provided a tire structure in which the load is suspended upon elastic portions of the tire and that these elastic portions also support the tire for side thrust in going around curves and the like so that the tread portion of the tire is resilient for both load carrying and side thrust and that the tread portion will give relatively to the load at any position where an obstruction is run over similar to the ordinary pneumatic tire.

Having thus described my invention what I claim as new and desire to secure by Letters Patent, is:

1. In a tire structure of the class described, a tread portion provided with oppositely disposed, outwardly inclined, elastic extended portions, and load carrying supports secured thereto at their outer edges, and a felly to which said supports are secured, whereby, the load is suspended under tension of said outwardly inclined, elastic portions, so that the strain shall be in lines with said extended portions.

2. In a tire structure of the class described, a tread portion provided with oppositely disposed, outwardly inclined, elastic extended portions and a pair of flaring or outwardly inclined, load carrying rim members secured thereto at their outer edges, and a felly to which said rim members are secured, whereby the load is suspended under tension of said outwardly inclined, elastic portions so that the strain shall be in lines with said extended portions.

3. In a device of the class described, an elastic and resilient tread member provided with oppositely disposed, outwardly inclined, elastic tension flanges, a wheel felly in spaced relation thereto and a pair of outwardly inclined rim members secured to the extended edges of said flange members and to the felly whereby the load is supported under tension of said elastic flange and the strain exerted in radial lines therewith.

4. In a vehicle tire, an elastic and resilient tread member provided with oppositely disposed, outwardly inclined, elastic tension flanges, a wheel felly in spaced relation thereto, and means for suspending said felly under tension in spaced relation with said tread member, comprising a pair of metallic annular, outwardly inclined rim members secured to the extended edges of said tension flange members and clamp means for securing said annular rim members to said flange members, whereby the load is supported under tension and the strain exerted in radial lines with said elastic flanges.

In testimony whereof, I have hereunto set my hand at San Diego, California, this ninth day of May, 1919.

CLARENCE S. PRESTON.